(12) United States Patent
Ashton et al.

(10) Patent No.: US 7,963,482 B2
(45) Date of Patent: Jun. 21, 2011

(54) AIRCRAFT DOOR

(75) Inventors: Larry J. Ashton, Springville, UT (US);
Kendall J. Fowkes, Provo, UT (US);
Michael G. Allman, Spanish Fork, UT (US)

(73) Assignee: Spectrum Aeronautical, LLC, Carlsbad, CA (US)

( * ) Notice: Subject to any disclaimer, the term of this patent is extended or adjusted under 35 U.S.C. 154(b) by 767 days.

(21) Appl. No.: 12/025,152

(22) Filed: Feb. 4, 2008

(65) Prior Publication Data
US 2009/0194637 A1 Aug. 6, 2009

(51) Int. Cl.
*B64D 9/00* (2006.01)
*B64C 1/14* (2006.01)
(52) U.S. Cl. .................. 244/129.5; 244/129.6
(58) Field of Classification Search ............... 244/129.4, 244/129.5, 118.3, 129.6, 137.1, 137.2; 49/116, 49/117, 142, 163, 168, 246, 254, 261
See application file for complete search history.

(56) References Cited

U.S. PATENT DOCUMENTS

| | | | | |
|---|---|---|---|---|
| 5,520,358 A | * | 5/1996 | Kahn et al. | 244/129.5 |
| 6,126,114 A | * | 10/2000 | Victor | 244/129.5 |
| 7,669,797 B2 | * | 3/2010 | Yada et al. | 244/129.5 |

* cited by examiner

*Primary Examiner* — Tien Dinh
*Assistant Examiner* — Richard R Green
(74) *Attorney, Agent, or Firm* — Nydegger & Associates

(57) ABSTRACT

A cabin door assembly is provided for use with a pressurized aircraft. The assembly includes two door halves for engaging the fuselage of the aircraft. Structurally, each door half includes a waist section integral with an adjoining tapered section. Further, the assembly includes an activator that is mounted on the fuselage and attached to the door halves. Specifically, the activator is attached to each door half to concertedly move each door half between a closed configuration and an open configuration. In the closed configuration, the door halves are sealed to the fuselage and to each other for pressurization of the aircraft. In the open configuration, the door halves extend outwardly from the fuselage to allow for aircraft ingress and egress.

18 Claims, 5 Drawing Sheets

AIRCRAFT DOOR

FIELD OF THE INVENTION

The present invention pertains generally to assemblies for closing and opening the cabin door of an aircraft. More particularly, the present invention pertains to a cabin door for a pressurized aircraft wherein the door is larger than the opening it covers, and wherein the door engages with the aircraft fuselage from inside the cabin of the aircraft. The present invention is particularly, but not exclusively, useful as a cabin door for a pressurized aircraft wherein the door, when engaged with the aircraft fuselage, is incorporated as a primary structural element of the aircraft.

BACKGROUND OF THE INVENTION

In addition to the usual and familiar functions of providing for ingress and egress into/from the cabin of an aircraft, aircraft doors must typically perform other functions. For one, they must contribute to the structural integrity of the aircraft. For another, aircraft doors should be designed so as to not interfere with the aircraft's flight performance. Further, in the specific case of a pressurized aircraft, an aircraft door must also be engineered to become an integral part of the pressure vessel when the aircraft is pressurized. The importance of this last point is underscored by a simple example. For a fifteen square foot door area, a pressure differential of ten pounds per square inch ($\Delta p=10$ psi), between the inside and the outside of the aircraft at altitude, will exert a total force against the inside of the door equal to 21,600 lbs. The door and fuselage, of course, must react to this force. Clearly, aircraft door design is a major consideration.

In general, when high pressure differentials are required (e.g. $\Delta p>5$ psi), the design of doors for pressurized aircraft have typically required that the door somehow overlap and grip the door frame on the fuselage. Importantly, this is most effectively accomplished with an overlap from inside the aircraft. With such designs, the pressure differential at altitude will effectively "push" the door against the door frame. A consequence of this has been that the door itself is necessarily larger than the doorway opening. Accordingly, with such a design, ingress and egress to the cabin is only possible if the door can somehow be retracted into the cabin. For large aircraft, this has been acceptable. For smaller aircraft, however, this solution may well be unacceptable or, at best, inconvenient.

In light of the above, it is an object of the present invention to provide an assembly suitable for the purposes of providing a door for a pressurized plane which opens and extends outwardly from the aircraft fuselage when the plane is depressurized. It is another object of the present invention to provide assemblies and methods to create a pressure seal with door overlap from inside the aircraft during aircraft pressurization, while providing for an external extension of the door from the aircraft when the aircraft is depressurized. It is yet another object of the present invention to provide assemblies and methods for operating a cabin door of a pressurized aircraft which allows portions of the door to engage with the aircraft fuselage from inside the cabin for a closed configuration, yet be positioned outside the aircraft when the door is in an opened configuration. Still another object of the present invention is to provide a door assembly for a pressurized aircraft that can be opened and closed easily and that is extremely reliable.

SUMMARY OF THE INVENTION

The present invention is directed to a cabin door assembly for use in a pressurized aircraft. For purposes of this disclosure, the aircraft's fuselage defines a longitudinal axis, and it defines a vertical axis that is perpendicular to the longitudinal axis. Further, the aircraft fuselage includes a curved wall that forms a doorway bounded by a frame. Preferably, the doorway is generally octagonally shaped.

The aircraft door assembly for the present invention includes a lower door half and an upper door half. Structurally, each door half has a substantially rectangular-shaped waist section that adjoins, and is integral with, a substantially isosceles trapezoidal-shaped tapered section. Each waist section is bound by a mid edge which is oriented on the fuselage parallel to the fuselage's longitudinal axis. Further, each waist section is bound by opposed side edges which are substantially perpendicular to the mid edge and which extend from the mid edge toward the tapered section. Structurally, the tapered section is bounded by an end edge that is parallel to the mid edge. Further, each tapered section is bounded by two angled edges that connect the end edge with the respective side edges of the waist section. As envisioned for the present invention, each door half is provided with a grip connection along the edges of each tapered section, i.e., along the end edge and the angled edges. Operationally, these grip connections seal each door to the fuselage when the door assembly is in a closed configuration. In this closed configuration, the side edges of each door half are flush against corresponding portions of the fuselage, with a pressure seal activated therebetween. Further, the mid edges of the door halves include a mating tongue-and-groove assembly that interconnects the upper and lower door halves with each other when the door assembly is in the closed configuration.

For its operation, the door assembly includes an activator that is mounted on the fuselage, and is attached to both the upper and lower door halves. Operationally, the activator concertedly moves the door halves between the closed configuration and an open configuration. As indicated above, in the closed configuration, the respective door halves are sealed to the fuselage at the end edges, tapered edges and side edges while the mid edges are sealed to each other for pressurization of the aircraft. In the open configuration, however, the door halves extend from their respective end edges and outwardly from the fuselage to allow for aircraft ingress and egress.

During movement from the closed configuration to the open configuration, each door half is initially moved into the cabin and toward the longitudinal axis of the fuselage. At the same time, the respective end edge of each door half is separated from the door frame. Subsequently, each door half is pivoted generally about its end edge and out of the aircraft. During this movement, the door halves pass their respective mid edge out of the fuselage, followed by its end edge. Specifically, the lower door half will pivot downwardly to create a so-called "air stair," and the upper door half will pivot upwardly to create an awning.

For all embodiments of the present invention, it is important the door be larger than the doorway opening. Stated differently, the perimeter "$P_d$" of the door will be larger than the perimeter "$P_o$" of the doorway opening. Structurally, the purpose is to employ over-pressures inside the cabin as a force that will hold the door against the doorway opening during flight. Further, this force is intended to also help incorporate the door as a primary structural element that adds to the integrity and strength of the aircraft fuselage.

Due to the dimensional relationship between the door and the doorway (i.e. the door is larger than the doorway), and the fact the entire door is positioned inside the aircraft cabin when it is closed, the task of opening the door presents several issues. As a first step in opening the door, it is necessary to somehow withdraw the door into the aircraft cabin. This withdrawal may then be followed by a reorientation of the door inside the cabin. Specifically, a spatial reorientation of the door will be necessary if the door is to be moved from inside the aircraft cabin to a position outside the aircraft. More specifically, such an orientation will be necessary for the door to clear the doorway. Closing the door, of course, requires the opposite sequence of actions.

In a first alternate embodiment of the present invention, once the door is moved from its closed position and has been withdrawn into the cabin, the door can be appropriately rotated. Once so rotated, the door can then be maneuvered through the doorway to the outside of the aircraft. In a second alternate embodiment of the present invention, after the door has been withdrawn into the cabin, it can then be moved to clear the doorway.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
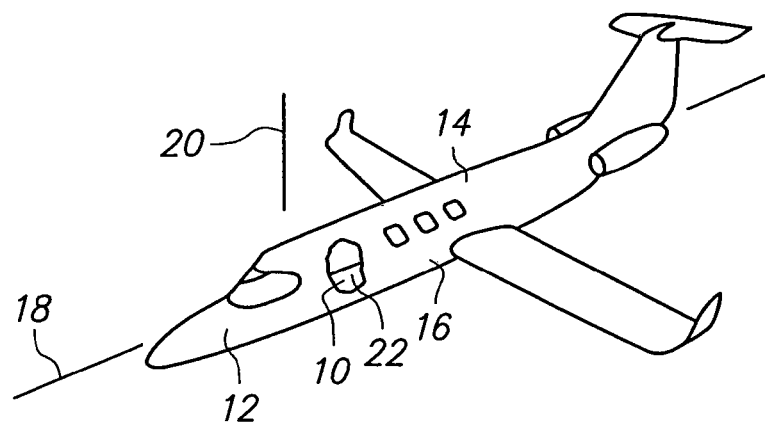
FIG. 1 is a perspective view of an aircraft with a cabin door assembly of the present invention installed thereon.

Referring initially to FIG. 1, a cabin door assembly for use in a pressurized aircraft is shown and designated 10. As shown, the door assembly 10 provides for ingress and egress to the fuselage 12 of the aircraft 14. Structurally, the fuselage 12 is formed by a curved wall 16 and defines a longitudinal axis 18 and a vertical axis 20. Further, the curved wall 16 defines a doorway 22.

Figure 2:
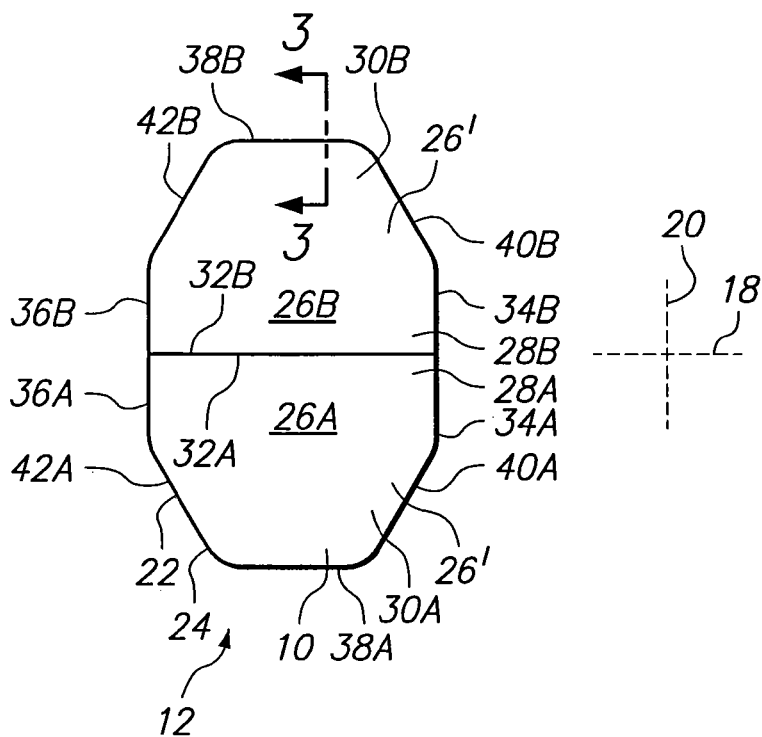
FIG. 2 is a front elevation view of the door assembly shown in FIG. 1.

Referring to FIG. 2, it can be seen that the doorway 22 is formed in the fuselage 12 with a generally octagonal periphery 24. Further, it can be seen that the door assembly 10 includes two door halves 26a, 26b for closing the doorway 22. As shown, each door half 26a,b includes a waist section 28a, 28b and a tapered section 30a, 30b. Structurally, each waist section 28a,b is bound by a mid edge 32a, 32b that is substantially parallel to the longitudinal axis 18 of the fuselage 12. Further, each waist section 28a,b is bound by a side edge 34a, 34b and a parallel side edge 36a, 36b that extend perpendicularly from the mid edge 32a,b toward the respective tapered section 30a,b. Structurally, each tapered section 30a,b is bound by an end edge 38a, 38b. Further, each tapered section 30a,b is bound by an angled edge 40a, 40b and an angled edge 42a, 42b that interconnect the respective end edge 38a,b with the respective side edges 36a,b and 38a,b. In FIG. 2, each door half 26a,b is shown in its respective closed configuration 26'.

In the closed configurations 26', three types of seals are provided around the door halves 26a,b. First, both the end edges 38a,b and the angled edges 40a,b and 42a,b of the tapered sections 30a,b of the door halves 26a,b overlap and engage the periphery 24 of the doorway 22. Second, the side edges 34a,b and 36a,b of the waist sections 28a,b of the door halves 26a,b abut and are flush with the periphery 24 of the doorway 22. Third, the mid edges 32a,b of the door halves 26a,b overlap and engage each other.

Figure 3:
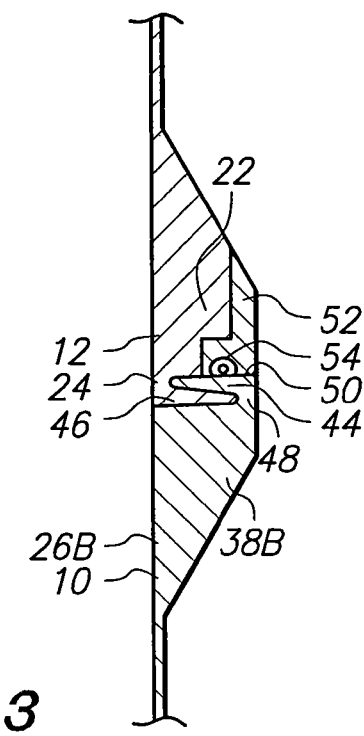
FIG. 3 is a cross sectional view of the interconnection between a door half and the doorway taken along line 3-3 in FIG. 2.

In FIG. 3, the type of connection between the doorway 22 and the tapered sections 30a,b of the door halves 26a,b along the end edges 38a,b and angled edges 40a,b and 42a,b is illustrated. Specifically, the exemplary end edge 38b is shown sealed in engagement with the doorway 22. As shown, the door half 26b is provided with an outwardly-facing (i.e., away from the longitudinal axis 18) hooked portion 44 along the end edge 38b. In order to provide structural engagement between the fuselage 12 and the tapered section 30b of the door half 26b, the fuselage 12 is provided with an inwardly-facing (i.e., toward the longitudinal axis 18) hooked portion 46. Together, the hooked portions 44, 46 comprise a tongue-and-groove type grip connection 48 at the interface 50 between the tapered sections 30a,b and the doorway 22. In addition to the tongue-and-groove grip connection 48, the door assembly 10 is provided with a locking system 52 that includes an inflatable pressure seal 54. As shown, the pressure seal 54 is positioned along the interface 50 between the fuselage 12 and the tapered sections 30a,b of each door half 26a, 26b.

Figure 4:
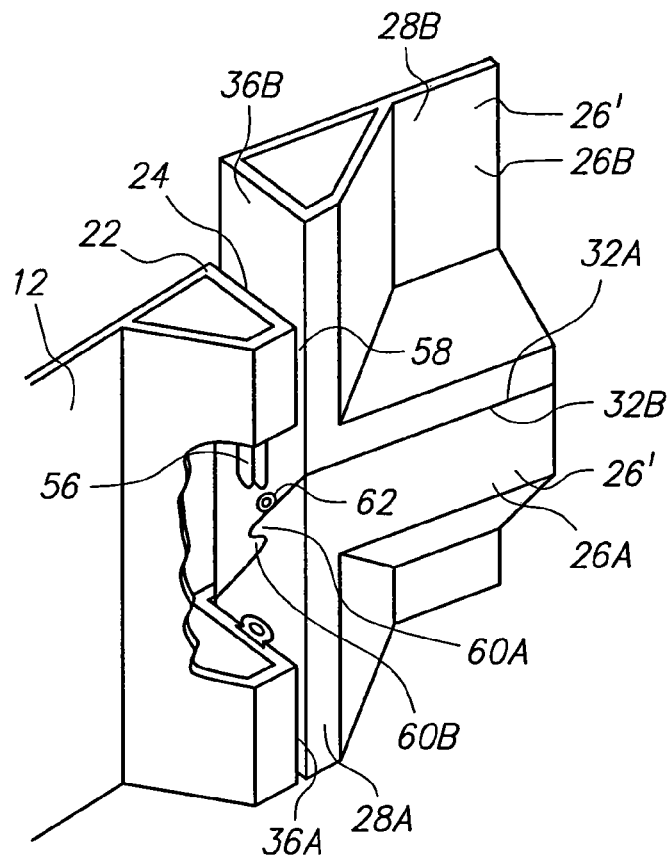
FIG. 4 is a perspective view of the interconnection between the door halves, and between the door halves and the doorway, in accordance with an embodiment of the present invention, with portions of the doorway cut away for clarity.

As indicated above, there is no overlap between the doorway 22 and the side edges 34a,b and 36a,b of the waist sections 28a,b of the door halves 26a,b. Further, no hooked portions 44 are provided on the side edges 34a,b and 36a,b, nor are any hooked portions 46 provided on the periphery 24 of the doorway 22 adjacent the side edges 34a,b and 36a,b. This can be seen in FIG. 4, where the side edges 34a,b of the door halves 26a,b abut and rest flush with the periphery 24 of the doorway 22. As a result, the waist sections 28a,b are free to slide against the periphery 24 of the doorway 22 when not sealed. As shown in FIG. 4, a cylindrical rubber pressure seal 56 is provided along the interface 58 between the fuselage 12 and the waist section 28a,b of each door half 26a, 26b to seal the waist sections 28a,b to the fuselage 12.

Still referring to FIG. 4, the interconnection between the door halves 26a and 26b is illustrated. As shown, the lower door half 26a includes an outwardly-facing hooked portion 60a along its mid edge 32a. Also, the upper door half 26b includes an inwardly-facing hooked portion 60b along its mid edge 32b. Structurally, the hooked portions 60a and 60b engage in a tongue-and-groove relationship when the door halves 26a, 26b are in the closed configuration 26'. Further, a rubber split door pressure seal 62 is provided at the mid edges 32a,b to further seal the door halves 26a,b in the closed configurations 26'.

Figure 5:
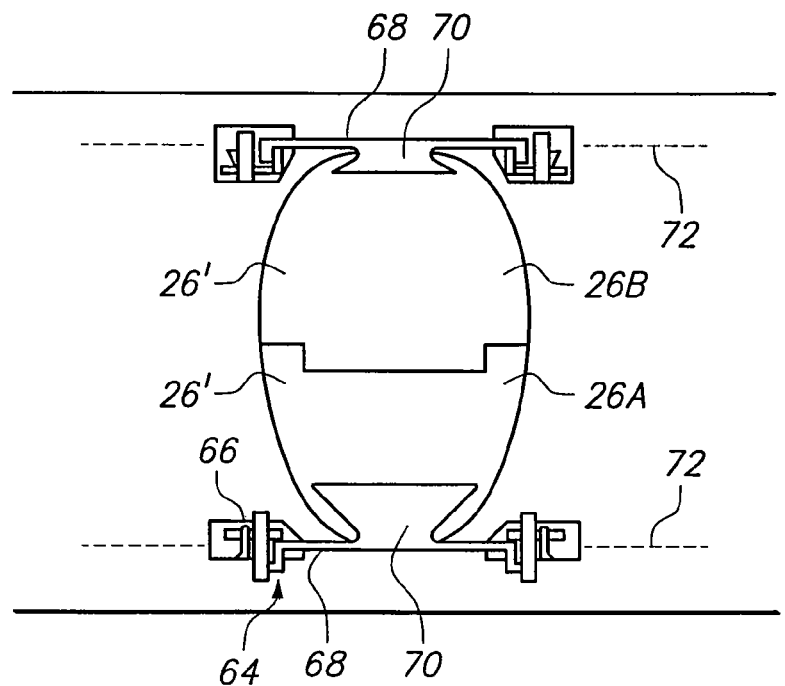
FIG. 5 is a front elevation view of the door assembly of the present invention illustrating the drive mechanisms.

Referring now to FIG. 5, it can be seen that the door assembly 10 is provided with an activator (generally designated 64) that includes drive mechanisms 66 for moving the door halves 26a,b between their closed configurations 26' and open configurations (not shown). As shown, each door half 26a,b is rigidly connected to a respective cross bar 68 by an arm 70. Further, each cross bar 68 defines a respective cross bar axis 72 that is parallel to the longitudinal axis 18 (shown in FIGS. 1 and 2). As shown in FIG. 5, each cross bar 68 is connected to a pair of drive mechanisms 66. For purposes of the present invention, each pair of drive mechanisms 66 is able to rotate each cross bar 68 about a respective axis 72 and to convey each cross bar 68 along a path (not shown). More specifically, each drive mechanism 66 comprises an electric motor that turns a gear box. Further, the gear box is connected to the drive shaft (not shown) to provide a torque thereupon to rotate the drive shaft to impart movement to the cross bar 68.

Figure 6:
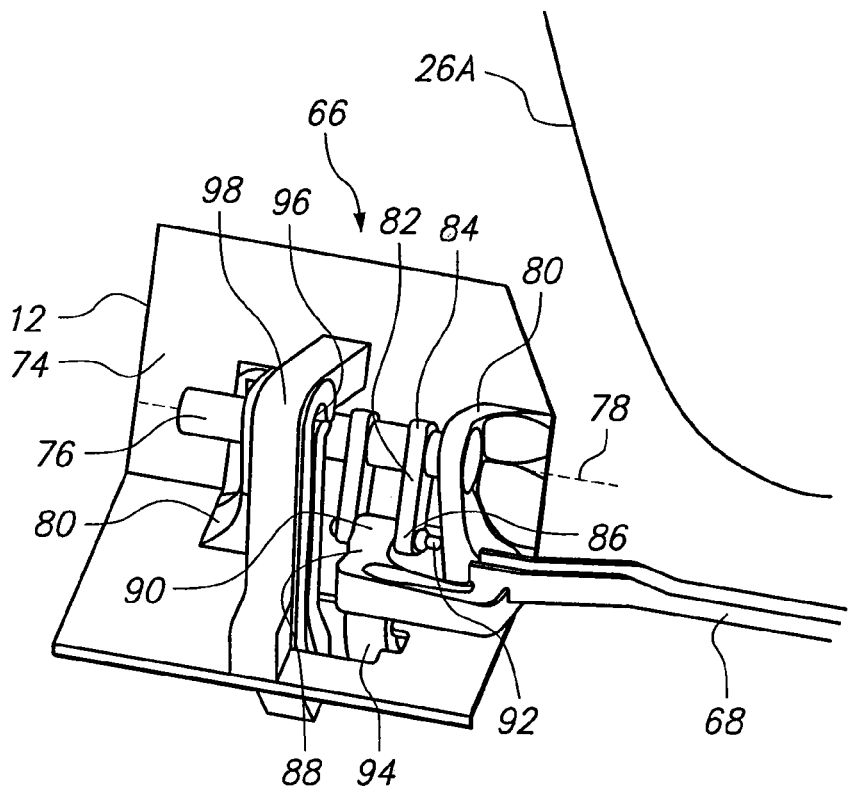
FIG. 6 is a detailed perspective view of a drive mechanism shown in FIG. 5.

The structure of an exemplary drive mechanism 66 is illustrated in FIG. 6. As shown, the drive mechanism 66 is mounted to the fuselage 12 through a mounting plate 74. Further, a drive shaft 76 is connected to the mounting plate 74 for rotation about a drive axis 78 via ears 80. For purposes of the present invention, the drive axis 78 is parallel to the longitudinal axis 18 (shown in FIGS. 1 and 2). In FIG. 6, it can be seen that a drive link 82 is rigidly connected to the drive shaft 76. Specifically, the drive link 82 includes an end 84 that receives the drive shaft 76. Further, the drive link 82 extends to an end 86. As shown, a cross link 88 is pivotably mounted to the end 86 of the drive link 82. Structurally, the cross link 88 includes an end 90 that is connected to the end 86 of the drive link 82 via a pivot pin 92. Further, the cross link 88 extends to an end 94. For purposes of the present invention, the end 94 of the cross link 88 is received within a guide track 96 formed in a guide arm 98. Further, as shown, the cross link 88 is integral with, or rigidly connected to, the cross bar 68. As a result of this structure, movement of the cross bar 68 is limited to a defined path.

Figures 7A, 7B:
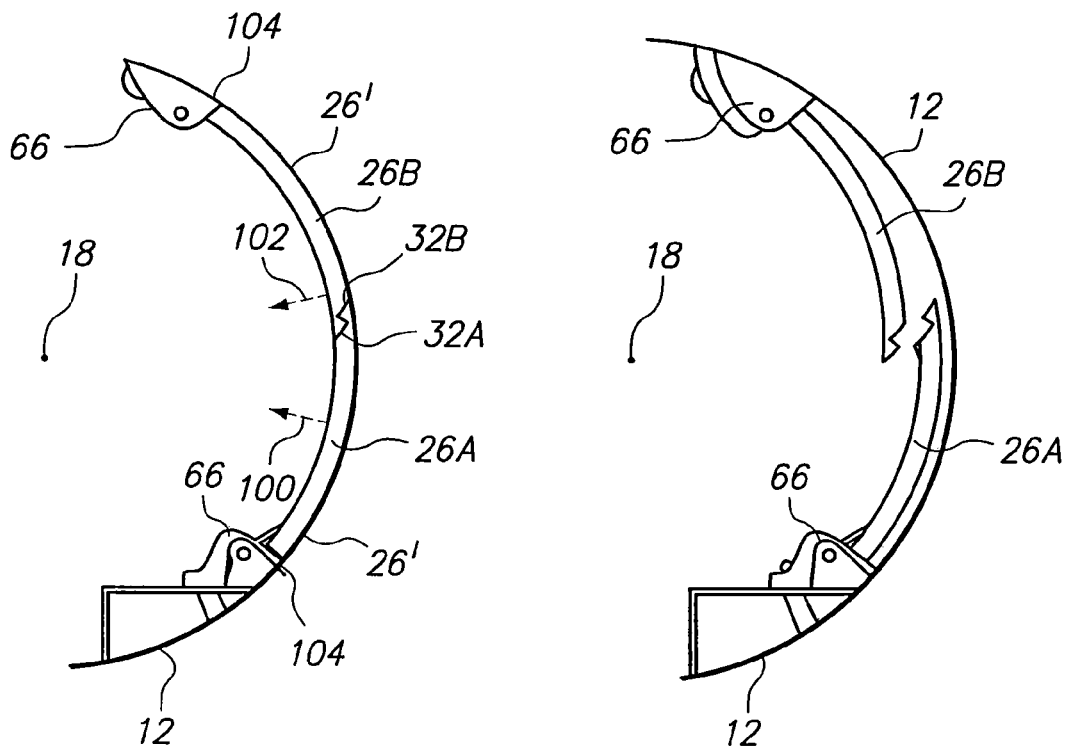
FIGS. 7A-7E are schematic views of the path of the door assembly from the closed configuration to the open configuration in accordance with an embodiment of the present invention.
Figure 7C:
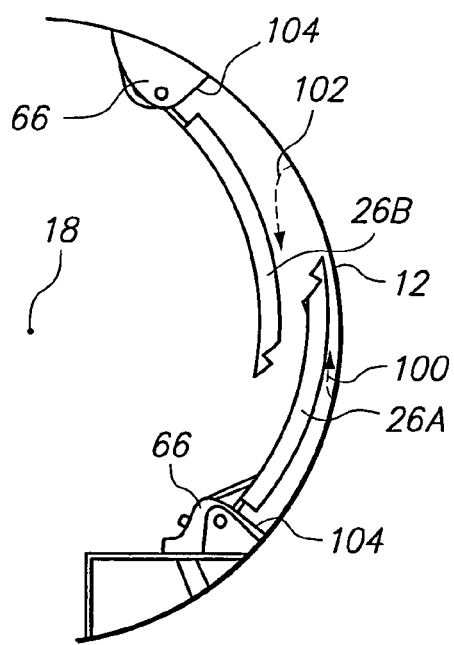

With the structure of the door assembly 10 in mind, its operation may be understood. Referring to FIGS. 7A-7E, the movement of the door halves 26a,b between the closed configurations 26' and open configurations is shown. In FIG. 7A, the door halves 26a,b are in the closed configurations 26'. In order to open the door halves 26a,b, the drive mechanisms 66 are actuated to move the door halves 26a,b initially inwardly toward the longitudinal axis 18 along respective paths 100, 102. In FIG. 7B, the door halves 26a,b are shown after beginning such a movement. In FIG. 7C, the door halves 26a,b are shown after completion of the inward movement toward the longitudinal axis 18, and after completion of the movement away from the distal portions 104 of the doorway 22 that abut the end edges 38a,b of the door halves 26a,b when closed. Preferably, the lower door half 26a is raised about six inches and the upper door half 26b is lowered about six inches during the movement away from the distal portions 104 of the doorway 22. In this manner, further engagement between the end edges 38a,b and angled edges 40a,b and 42a,b of the door halves 26a,b with the periphery 24 of the doorway 22 is prevented. In other words, the fuselage 12 is removed from the path of the door halves 26a,b. The movements of the door halves 26a,b toward the longitudinal axis 18 and away from the distal portions 104 of the doorway 22 are controlled by the cooperative actions of the drive shaft 76 and the guide track 96 on the cross link 88 connected to the cross bar 68 as shown in FIG. 6.

Figure 7D:
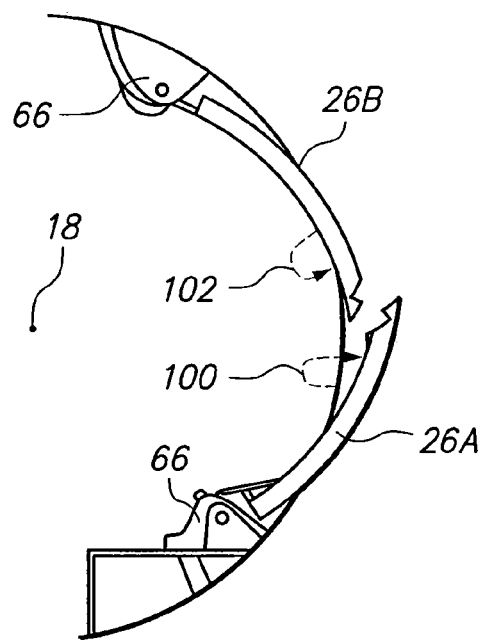
Figure 7E:
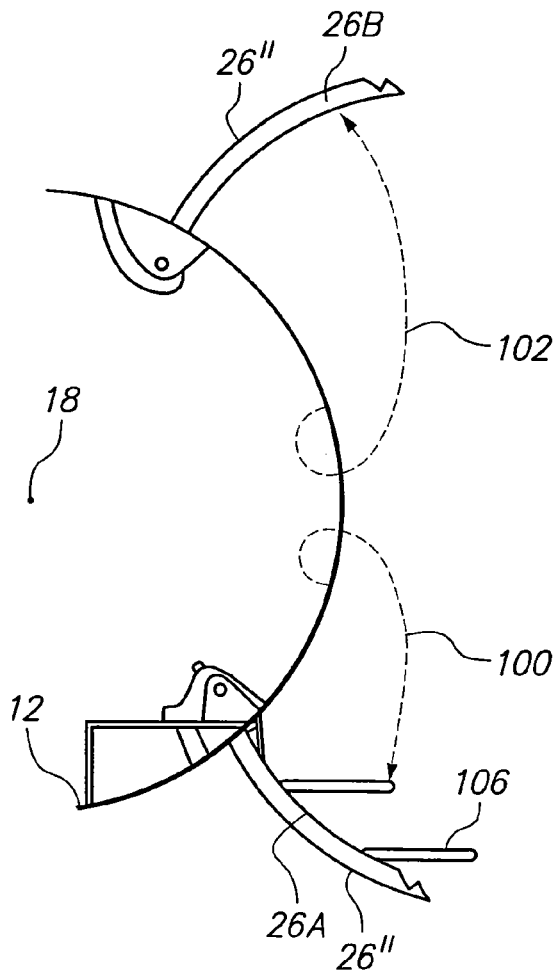

Referring now to FIG. 7D, movement of the door halves 26a,b along the paths 100, 102 out of the fuselage 12 is illustrated. As shown, after the fuselage 12 is cleared from the paths 100, 102 of the door halves 26a,b as in FIG. 7C, the door halves 26a,b are pivoted about the cross bar axes 72 while the cross link 88 continues to slide along the guide track 96, as shown in FIG. 6. In FIG. 7E, the door halves 26a,b are shown in their open configurations 26" after movement along the paths 100, 102 has been completed. As shown, the lower door half 26a includes steps 106 to ease ingress and egress from the fuselage 12. As a result of their placement outside of the fuselage 12 when open, the door halves 26a,b do not take up any interior space of the fuselage 12 which may be an important consideration, especially for small aircraft.

Figure 8:
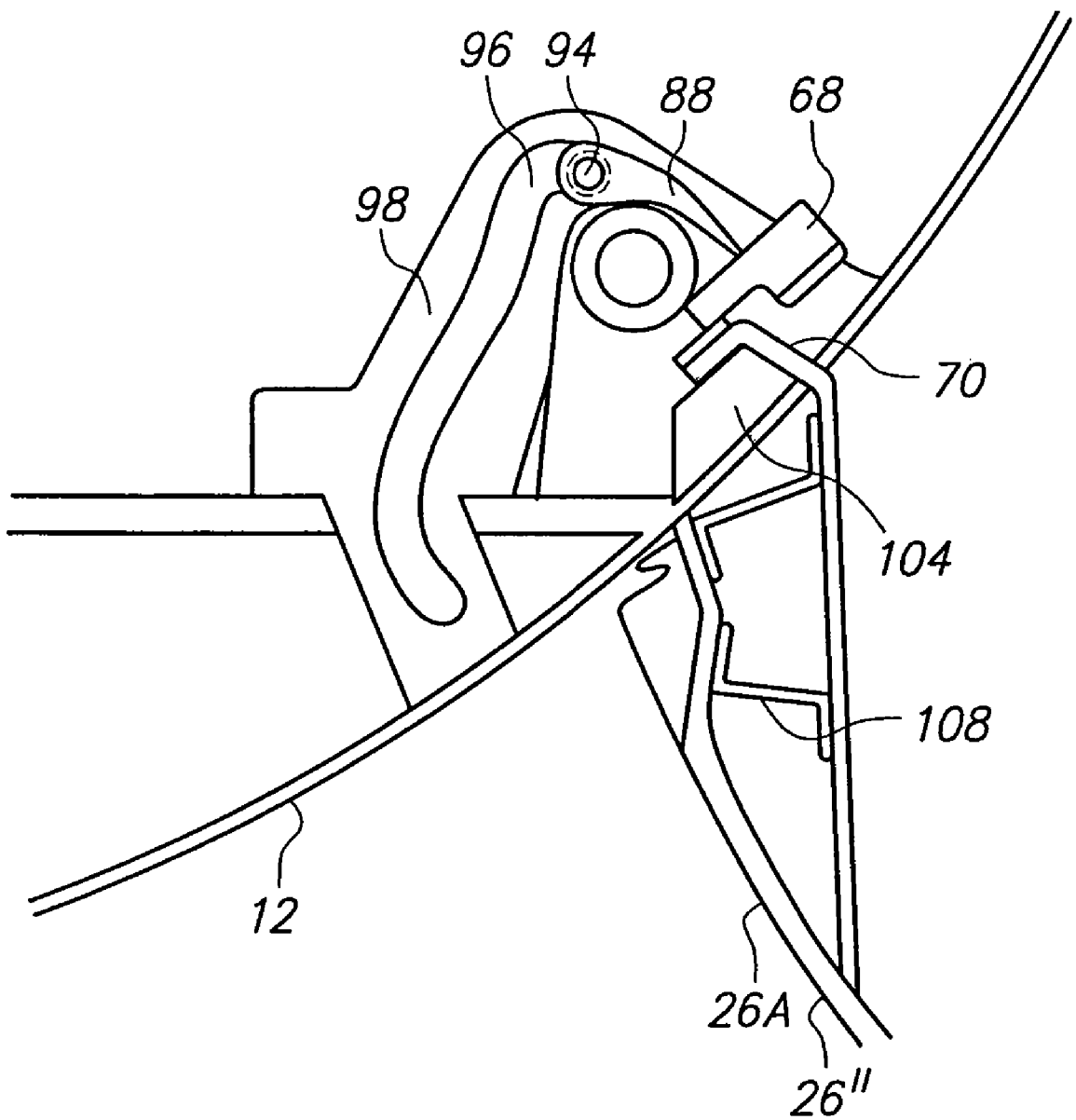
FIG. 8 is a schematic view of the interconnection between the drive mechanism and a door half in its open configuration.

In FIG. 8, the connection between the fuselage 12 and the door half 26a in the open configuration 26" is more clearly illustrated. As shown, the end edge 38a of the door half 26a abuts the fuselage 12. Further, the arm 70 connecting the door half 26a to the cross bar 68 wraps around the distal portion 104 of the doorway 22 to secure the door half 26a in the open configuration 26". Also, the door half 26a is provided with legs 108 to provide further connection to the arm 70. In order to stabilize the door half 26a, tension cables (not shown) may be added to connect the mid edge 32a of the door half 26a to the fuselage 12. As shown in FIG. 8, the guide track 96 in the guide arm 98 prevents any further movement of the distal end 94 of the cross link 88.

In order to close the door halves 26a,b, the drive shafts 76 are rotated in the opposite direction by the drive mechanisms 66 and the distal ends 94 of the cross links 88 are pulled through the guide tracks 96 while the cross bars 68 pivot about the bar axes 72. As a result, the door halves 26a,b retrace their positions through the paths 100, 102.

It is noted that in describing the Aircraft Door, the term "door half" has been employed. Herein, "door half" does not require a specific mathematic proportion or relationship between two door halves. For instance, one door half could be larger than the other door half.

While the particular Aircraft Door as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A cabin door assembly for operational engagement with the fuselage of a pressurized aircraft which comprises:

an upper door half having a waist section bound by an upper mid edge, with the waist section abutting a tapered section, and with the tapered section extending from the waist section to an upper end edge;

a lower door half having a waist section bound by a lower mid edge, with the waist section abutting a tapered section, and with the tapered section extending from the waist section to a lower end edge; and an activator mounted on the fuselage and attached to the upper door half and to the lower door half for concertedly moving the door halves between a closed configuration wherein the respective tapered sections are sealed to the fuselage and the respective mid edges are sealed to each other for pressurization of the aircraft, and an open configuration wherein the door halves extend from their respective end edges and outwardly from the fuselage to allow for aircraft ingress and egress;

wherein the fuselage defines a longitudinal axis and wherein the activator comprises an upper drive mechanism that is attached to the upper end edge of the upper door half and a lower drive mechanism that is attached to the lower end edge of the lower door half;

wherein each drive mechanism comprises:

a cross bar defining a bar axis substantially parallel to the longitudinal axis, with said cross bar being mounted to the respective door half; and a means for rotating the cross bar about the bar axis and conveying the cross bar along a path to move the respective door half between its closed configuration and its open configuration.

2. A cabin door assembly as recited in claim 1 wherein each waist section is further bound by two substantially parallel side edges that extend perpendicularly from the respective mid edge, and each tapered section is further bound by two angled edges that interconnect the respective side edges and the respective end edge.

3. A cabin door assembly as recited in claim 2 wherein the fuselage defines a longitudinal axis, and wherein each end edge is substantially parallel to the longitudinal axis, each mid edge is substantially parallel to the longitudinal axis, and each side edge is substantially perpendicular to the respective mid edge.

4. A cabin door assembly as recited in claim 2 further comprising means for sealing each door half to the fuselage in the closed configuration, wherein the sealing means are positioned on the end edge and the angled edges of each respective door half.

5. A cabin door assembly as recited in claim 4 wherein each sealing means comprises a grip connection to seal the respective door half to the fuselage in the closed configuration.

6. A cabin door assembly as recited in claim 4 wherein the side edges of each door half are flush with the fuselage in the closed configuration.

7. A cabin door assembly as recited in claim 1 wherein, for each door half, the waist section is integral with the tapered section.

8. A cabin door assembly as recited in claim 1 wherein each rotating and conveying means comprises:
   a drive shaft fixed to the fuselage for rotation about a drive axis substantially parallel to the longitudinal axis;
   a drive link having a first end rigidly mounted to the drive shaft and extending to a second end;
   a cross link having a proximal end pivotably connected to the second end of the drive link and extending to a distal end, with said cross link being mounted to the respective cross bar; and
   a guide track mounted to the fuselage, with said guide track receiving the distal end of the cross link to define a range of movement for the cross link, wherein rotation of the drive shaft causes the cross link to pivot and to move along the guide track, with the cross bar translating movement of the cross link to the respective door half.

9. A cabin door assembly as recited in claim 8 wherein each door half is provided with two rotating and conveying means, and wherein the respective cross bar interconnects the respective rotating and conveying means.

10. A cabin door assembly as recited in claim 1 further comprising a means for fastening the door halves to one another when each door half is in the closed configuration, with said fastening means being positioned on the mid edge of each door half.

11. A cabin door assembly as recited in claim 10 wherein the fastening means includes a tongue portion on the mid edge of one door half and a corresponding groove portion on the mid edge of the other door half, with the tongue and groove portions engaging when the door halves are in the closed configuration.

12. A cabin door assembly for operational engagement with the fuselage of a pressurized aircraft defining a longitudinal axis which comprises:
   at least one door half having a waist section and a tapered section, wherein the waist section is bound by a mid edge and two substantially parallel side edges that extend perpendicularly therefrom to the tapered section, and wherein the tapered section is bound by an end edge and two angled edges connecting the end edge to the side edges, with the end edge being substantially parallel to the mid edge; and
   a means for connecting each door half to the fuselage for movement of each door half between a closed configuration, wherein the end edges and angled edges of each door half overlap and are forced radially away from the axis into the fuselage to seal each door half to the fuselage for pressurization of the aircraft, and an open configuration, wherein each door half extends outwardly from the fuselage to allow for aircraft ingress and egress.

13. A cabin door assembly as recited in claim 12 wherein the at least one door half comprises:
   a first door half having a waist section and a tapered section, wherein the waist section is bound by a first mid edge and two substantially parallel side edges that extend perpendicularly therefrom to the tapered section, and wherein the tapered section is bound by a first end edge and two angled edges connecting the first end edge to the side edges, with the first end edge being substantially parallel to the first mid edge;
   a second door half having a waist section and a tapered section, wherein the waist section is bound by a second mid edge and two substantially parallel side edges that extend perpendicularly therefrom to the tapered section, and wherein the tapered section is bound by a second end edge and two angled edges connecting the second end edge to the side edges, with the second end edge being substantially parallel to the second mid edge; and
   a means for sealing the first mid edge to the second mid edge when each door half is in its closed configuration.

14. A cabin door assembly as recited in claim 12 further comprising a means for moving the door half from the closed configuration to the open configuration, with the moving means initially moving the door half toward the longitudinal axis and away from the end edge, and with the moving means subsequently pivoting the door half and moving the door half away from the longitudinal axis to pass the waist section out of the fuselage followed by the tapered section to position the door half in the open configuration.

15. A method of providing ingress to and egress from an aircraft fuselage defining a longitudinal axis, said method comprising the steps of:
   providing an upper door half and a lower door half, with each door half having a waist section and a tapered section, wherein each waist section is bound by a mid edge and two substantially parallel side edges that extend perpendicularly therefrom to the tapered section, and wherein each tapered section is bound by an end edge and two angled edges connecting the end edge to the respective side edges, with each end edge being substantially parallel to the respective mid edge, and a means for connecting each door half to the fuselage for movement of each door half between a closed configuration, wherein the end edges and angled edges of each door half overlap and are forced radially away from the axis into the fuselage to seal each door half to the fuselage for pressurization of the aircraft, and an open configuration, wherein each door half extends outwardly from the fuselage to allow for aircraft ingress and egress;
   positioning each door half in the closed configuration by sealing the respective tapered sections with the fuselage and by sealing the respective mid edges to one another;
   initially moving each door half out of the closed configuration toward the longitudinal axis; and subsequently pivoting each door half and moving each door half away from the longitudinal axis to pass the respective waist section out of the fuselage followed by the respective end edge to position each door half in the open configuration to allow for aircraft ingress and egress.

16. A method as recited in claim 15 further comprising the step of mounting a cross bar to each door half, and wherein the moving and pivoting steps include the steps of:
rotating each cross bar; and
conveying each cross bar along a path to move the respective door half between the closed configuration and the open configuration.

17. A method as recited in claim 16 further comprising the steps of:
fixing a drive shaft to the fuselage for rotation about a drive axis substantially parallel to the longitudinal axis;
rigidly mounting a first end of a drive link to the drive shaft, with said drive link extending to a second end;
pivotably connecting a proximal end of a cross link to the second end of the drive link, with said cross link extending to a distal end;
mounting said cross link to the cross bar; and
connecting a guide track to the fuselage, with said guide track receiving the distal end of the cross link to define a range of movement for the cross link, wherein the rotating step causes the cross link to pivot and to move along the guide track, with the cross bar translating movement of the cross link to the respective door.

18. A method as recited in claim 15 wherein the side edges of each door half are flush with the fuselage when the door halves are in the closed configuration, with said side edges sliding with respect to the fuselage during the moving step.

* * * * *